United States Patent [19]

Fu et al.

[11] Patent Number: 5,748,181
[45] Date of Patent: May 5, 1998

[54] CURSOR CONTROLLING APPARATUS AND ITS DIRECTION DETECTION METHOD

[75] Inventors: Alex Fu; David Wang; Chris Wu, all of Taipei Hsien, Taiwan

[73] Assignee: Primax Electronics Ltd., Taipei Hsien, Taiwan

[21] Appl. No.: 270,012

[22] Filed: Jul. 1, 1994

[51] Int. Cl.⁶ .................................................. G09G 5/08
[52] U.S. Cl. ................... 345/165; 345/166; 250/231.13; 250/231.18
[58] Field of Search .......................... 345/163, 164, 345/165, 166, 167, 145, 156, 160, 157; 250/231.17, 206, 206.1, 231.13, 231.14, 231.15, 231.16, 231.18

[56] References Cited

U.S. PATENT DOCUMENTS

| | | |
|---|---|---|
| 4,920,259 | 4/1990 | Epstein .................... 250/231.13 |
| 4,993,659 | 2/1991 | Takai et al. ............... 250/231.13 |
| 5,003,170 | 3/1991 | Masuda et al. ............ 250/231.17 |
| 5,027,109 | 6/1991 | Donovan et al. ................ 345/165 |
| 5,070,726 | 12/1991 | Fukui et al. ............... 250/231.18 |
| 5,126,560 | 6/1992 | Kraus ....................... 250/231.13 |
| 5,168,268 | 12/1992 | Levy ............................... 345/165 |
| 5,287,120 | 2/1994 | Okada et al. ................... 345/163 |
| 5,541,623 | 7/1996 | Engstrom ....................... 345/165 |

*Primary Examiner*—Richard Hjerpe
*Assistant Examiner*—Lun-Yi Lao
*Attorney, Agent, or Firm*—Madson & Metcalf

[57] ABSTRACT

The present invention is related to a method used in a cursor controlling apparatus for detecting a direction a cursor should move on a monitor which comprises steps of: intermittently receiving a light to obtain a series of different optical quantities; generating a series of voltage signals respectively responsive to the series of optical quantities; and determining a direction by detecting a sequence of the voltage signals. The present invention can reduce manufacturing cost, economize assembling time, and obtain a more accurate direction.

12 Claims, 8 Drawing Sheets

|   | $P_A$ | $P_B$ | $P_C$ |
|---|---|---|---|
| A | 1 | 0 | 0 |
| B | 1 | 1 | 0 |
| C | 1 | 1 | 1 |

Fig. 8

CURSOR CONTROLLING APPARATUS AND ITS DIRECTION DETECTION METHOD

FIELD OF THE INVENTION

The present invention is related to a cursor controlling apparatus and its direction detection method, and especially related to a cursor controlling apparatus comparing voltage signals instead of pulse-mode signals to determine the direction of a cursor.

BACKGROUND OF THE INVENTION

A cursor controlling apparatus, e.g. a mouse or a track ball, controls the direction and the distance a cursor should move on a monitor by way of utilizing its rolling ball. In general, the moving distance that a cursor should move depends on the rolling of two grid wheels, an X-grid wheel and a Y-grid wheel, which engage with the rolling ball respectively in the X- and Y-directions. As for the determination of the moving direction that the cursor should move, a direction detection device which detects respectively in the X- and Y-directions, i.e. upwards or downwards in the Y-direction and leftwards or rightwards in the X-direction, and combines the results to determine the direction the cursor should move is needed.

A first and a second kinds of direction detection devices of conventional cursor controlling apparatuses used for determining the moving direction that a cursor should move will be respectively described below. The first kind of direction detection device of a conventional cursor controlling apparatus used for determining the moving direction that a cursor should move includes two photo diodes and two photo transistors in each of the X- and Y-directions. Between the photo diodes and the photo transistors in the X-direction, there exists an X-grid wheel having plural equal-sized holes. The photo diodes respectively emit lights which sequentially pass through the hole of the grid wheel and are received by the photo transistors. Because the lights emitted by the two photo diodes sequentially pass through the grid wheel and thus are intermittently received by the photo transistors, two series of equal pulse width but different phase pulse-mode signals are obtained after being processed by a rectifying circuit, as shown in FIG. 1. The two series of pulse-mode signals correspond to a series of pulse combination states, e.g. $(1,1) \rightarrow (0,1) \rightarrow (0,0) \rightarrow (1,0) \rightarrow (1,1) \rightarrow (0,1) \rightarrow \ldots$, which is a cyclic one. Observing the sequence of the series of pulse combination states, the direction detection device can judge the direction that the cursor should move. For example, the cursor will move rightwards if the pulse combination state $(1,1)$ is followed by $(0,1)$; but the cursor will move leftwards if the pulse combination state $(1,1)$ is followed by $(1,0)$. Of course, between the photo diodes and the photo transistors in the y directions, there also exists a Y-grid wheel having plural equal-sized holes and the judging principle in the Y-direction is the same as that in the X-direction.

The shortcomings of the first kind of direction detection device of the conventional cursor controlling apparatus include:

1. that two photo diodes and two photo transistors are needed in each of the X- and Y-directions to obtain two series of equal pulse width but different phase pulse-mode signals, and therefore higher manufacturing cost and more assembling time are caused;
2. that the relative position among the photo diodes, the grid wheel and the photo transistors must be accurately aligned to optimize a sensitizing angle and precisely obtain an optimum phase difference between the two series of pulse-mode signals, and therefore the manufacturing process is troublesome; and
3. that the identification of the moving direction will be difficult if there is no prominent phase difference that possibly results from the outside disturbance, e.g. the unstability of the light or the voltage on the RS 232 port, which makes the photo diodes and the photo transistors generate ripple phenomena to result in series of pulse-mode signals of ineffective pulse widths.

On the whole, the second kind of conventional direction detection device for determining the moving direction that a cursor should move is the same as the first one. The second one differs from the first one in using only one photo diode in each of the X- and Y-directions to emit light to be received by two photo transistors packed together. Therefore, the material cost of two photo diodes and the overall package cost of the photo transistors are saved. However, the aforementioned shortcomings 2 and 3 cannot be avoided because of the same direction detection method used. Moreover, the phase difference is not prominent if the two photo transistors almost simultaneously receive the light emitted by the sole photo diode. That can be repaired by reducing the number of the holes of the grid wheel, but it is to be noted that lesser holes will lead to lower resolution.

A patent application (U.S. patent Ser. No. 08/181,153 filed on Jan. 12, 1994) regarding a prior cursor controlling apparatus with an improved direction detection device invented by the Applicant is therefore offered to overcome the shortcomings of the conventional ones. The direction detection method of the prior cursor controlling apparatus generates only one series of unequal width and different phase pulse-mode signals and compares the sequence of the pulse-mode signals to determine the direction that a cursor should move in either the X-direction or the Y-direction. The direction detection device of the prior cursor controlling apparatus comprises a photo diode and a photo transistor in each of the X- and Y-directions. Between the photo diode and the photo transistor, there exists a grid wheel having plural holes of unequal widths. When light emitted by the photo diode passes through the grid wheel, the photo transistor receiving the light generates signals which are further processed to become a series of pulse-mode signals, as shown in FIG. 2. The series of pulse-moded signals shown in FIG. 2 is obtained by means of using a grid wheel which is shown in FIG. 3 and the width proportion of the holes are 1:2:3. According to the sequence of the series of pulse states, e.g. $(1,0) \rightarrow (1,1,0) \rightarrow (1,1,1,0) \rightarrow (1,0) \rightarrow (1,1,0) \rightarrow \ldots$, corresponding to the series of pulse-mode signals, the direction that a cursor should move is determined. For example, the cursor will move rightwards or upwards if the pulse state $(1,1,0)$ is followed by $(1,1,1,0)$; but the cursor will move leftwards or downwards if the pulse state $(1,1,0)$ is followed by $(1,0)$.

Obviously, the prior cursor controlling apparatus with an improved direction detection device invented by the Applicant avoids the defects of the aforementioned conventional ones, but there still exist some blemishes. Because the pulse states representing different pulse widths are used for detecting the moving direction, a counter and a register are necessary to record the pulse states. If the speed a user moves the cursor controlling apparatus is too slow, the pulse width will be prolonged excessively and the overflow of the counter and the register will be caused. Of course, the detected results will also be effected. The prior apparatus is more cost effective than the second conventional one because only one photo diode and one photo transistor are needed in each of the X- and Y-directions. However, the cost of the counter and the register is necessary and thus it is not economical enough. It is therefore tried by the Applicant to deal with this situation.

SUMMARY OF THE INVENTION

An object of the present invention is to offer a cursor controlling apparatus and its direction detecting device having a relative low manufacturing cost.

Another object of the present invention is to offer a cursor controlling apparatus and its direction detecting device having a reduced assembling time.

Further object of the present invention is to offer a cursor controlling apparatus and its direction detecting device for avoiding the defects caused by insignificant phase difference and obtaining a more accurate direction.

In accordance with the present invention, a method used in a cursor controlling apparatus for detecting a direction that a cursor should move on a monitor comprises steps of intermittently receiving a light to obtain a series of different optical quantities; generating a series of voltage signals respectively responsive to the series of optical quantities; and determining a direction by detecting a sequence of the voltage signals.

In accordance with another aspect of the present invention, the light is provided by a photo diode.

In accordance with another aspect of the present invention, the optical quantities are respectively accumulated from the light.

In accordance with another aspect of the present invention, the optical quantities are of three ones.

In accordance with another aspect of the present invention, a cursor controlling apparatus implementing the method comprises a shell; a driving device mounted in and protruding from the shell for moving a cursor on a monitor; a light source installed in the shell and emitting the light; and a detection device intermittently receiving said light to obtain said series of optical quantities, converting said optical quantities into said series of voltage signals, detecting said sequence of said voltage signals, and determining said direction said cursor should move on said monitor according to said sequence of said voltage signals.

In accordance with another aspect of the present invention, the light source is a photo diode.

In accordance with another aspect of the present invention, the optical quantities are of at least three ones different from one another.

In accordance with another aspect of the present invention, the driving device is a rolling ball.

In accordance with another aspect of the present invention, the detection device includes a sensitizing device intermittently receiving said light to obtain said series of optical quantities and converting said optical quantities into said series of voltage signals; and a processing device detecting said sequence of said voltage signals, and determining said direction said cursor should move on said monitor according to said sequence of said voltage signals.

In accordance with another aspect of the present invention, the sensitizing device includes:

a grid wheel driven by the driving device and having at least three holes of three different areas to respectively obtain the optical quantities; and a sensitizing element for receiving and then converting the optical quantities into the series of different voltage signals.

In accordance with another aspect of the present invention, the cursor controlling apparatus further comprises a mask installed on the grid wheel for light dispersion prevention.

In accordance with another aspect of the present invention, the sensitizing element is a photo transistor.

In accordance with another aspect of the present invention, the processing device is an application specific integrated circuit or a microprocessor.

In accordance with another aspect of the present invention, the application specific integrated circuit includes a sampling circuit for generating a clock according to the series of voltage signals; a comparing circuit for respectively comparing voltages of the voltage signals with at least three different voltages whenever a cycle of the clock begins, and converting the voltage signals into digital signals according to compared results; and a controller triggered by the clock to obtain a digital combination state of the digital signals for determining the direction of the cursor according to the combination state.

In accordance with another aspect of the present invention, the microprocessor uses a firmware thereof to determine the direction of the cursor.

The present invention may be best understood through the following description with reference to the accompanying drawings, in which:

BRIEF DESCRIPTION OF THE DRAWING

FIG. 8 is a table showing digital states obtained through an application specific integrated circuit and corresponding to different voltage signals according to the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
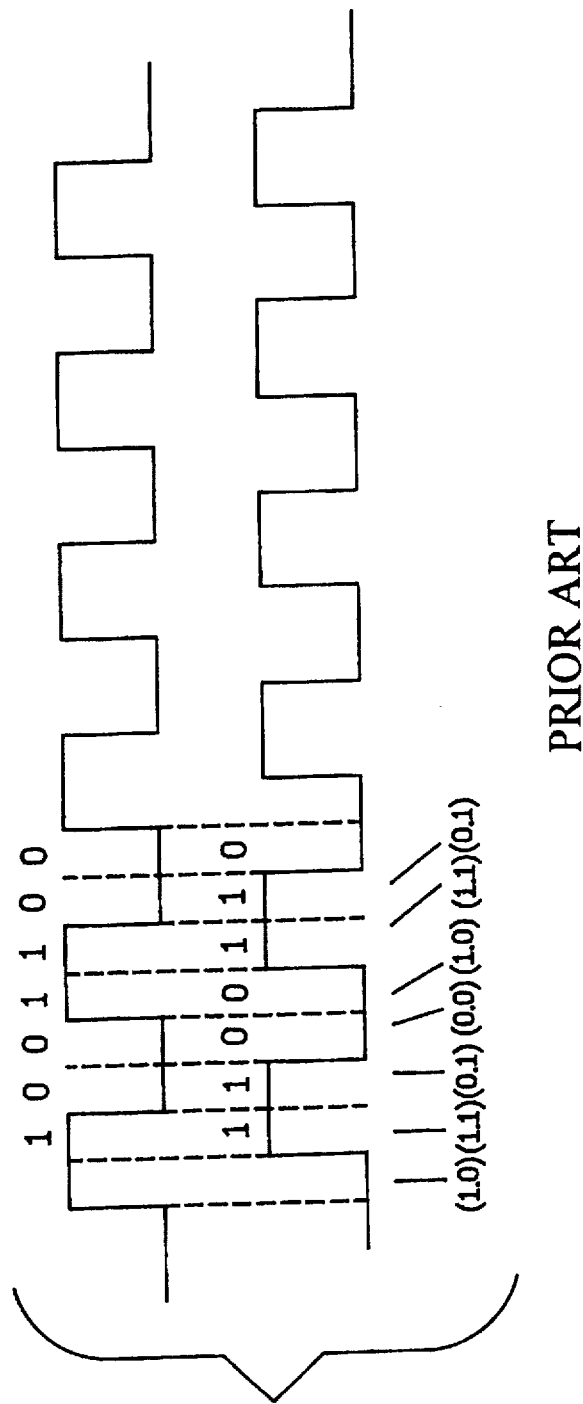
FIG. 1 is a schematic diagram showing two series of pulse-mode signals generated by a conventional cursor controlling apparatus for determining the direction that a cursor on a monitor should move.
Figure 2:
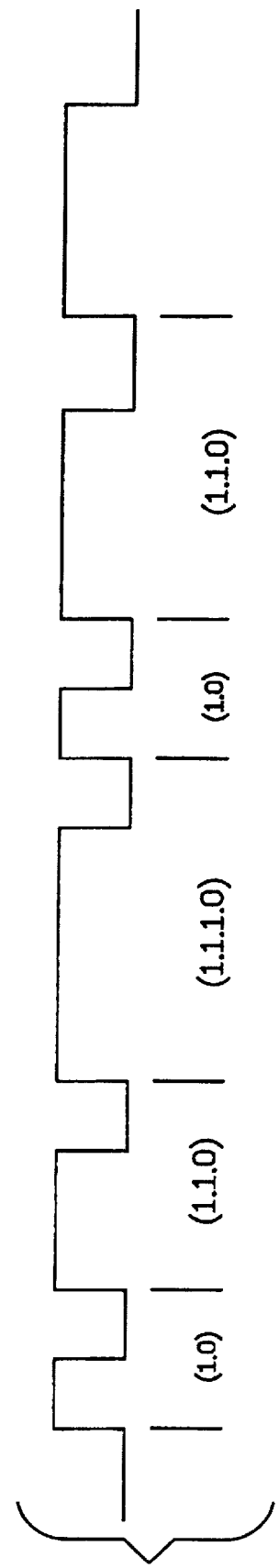
FIG. 2 is a schematic diagram showing a series of pulse-mode signals generated by a prior cursor controlling apparatus invented by the Applicant for determnining the direction that a cursor on a monitor should move.
Figure 3:
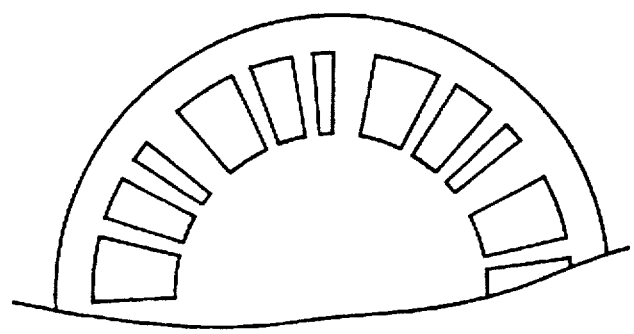
FIG. 3 is a schematic view showing a grid wheel with holes of different widths according to a prior cursor controlling apparatus invented by the Applicant.
Figure 4:
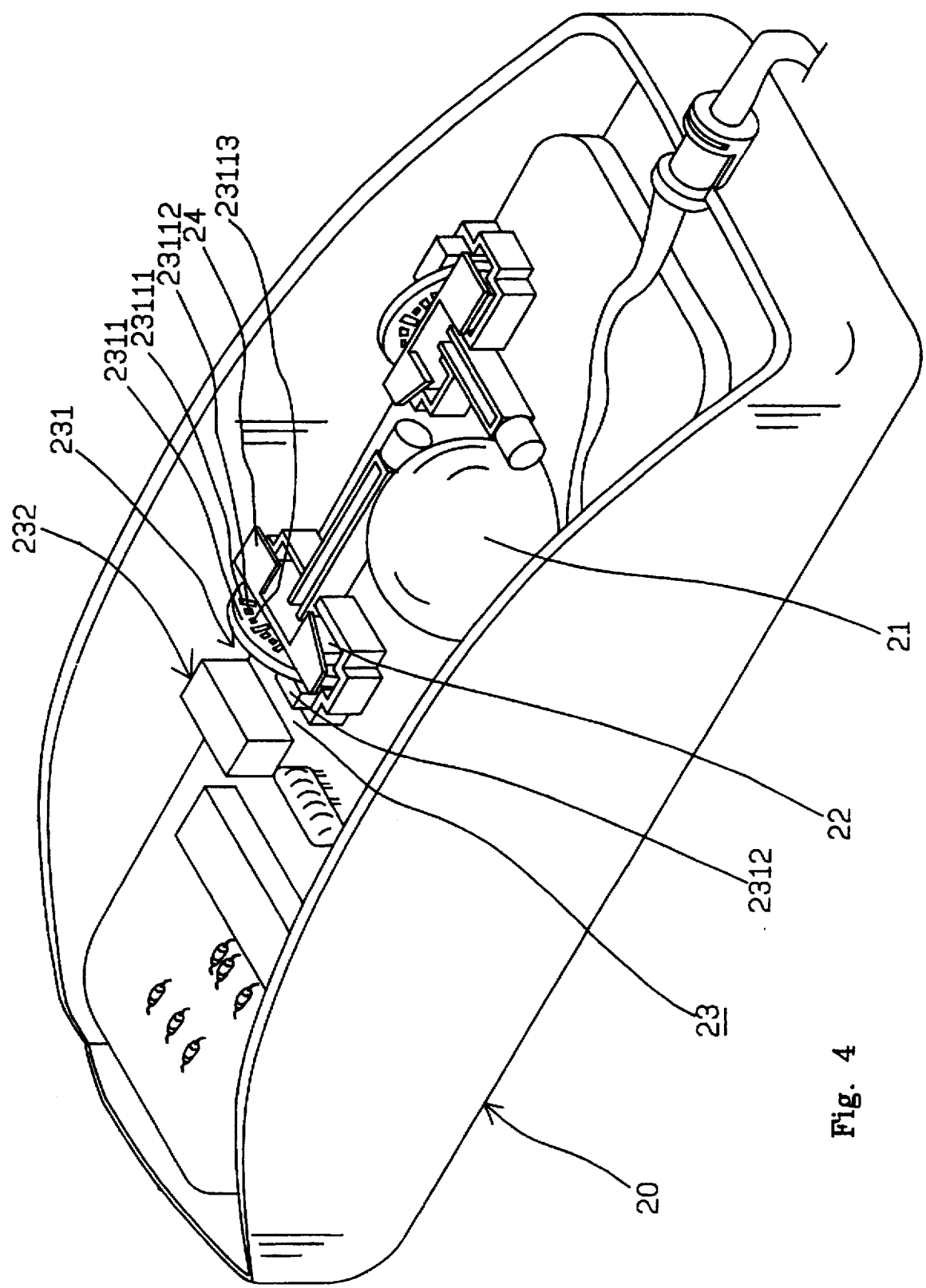
FIG. 4 is a perspective view showing a cursor controlling apparatus according to the present invention.
Figure 5:
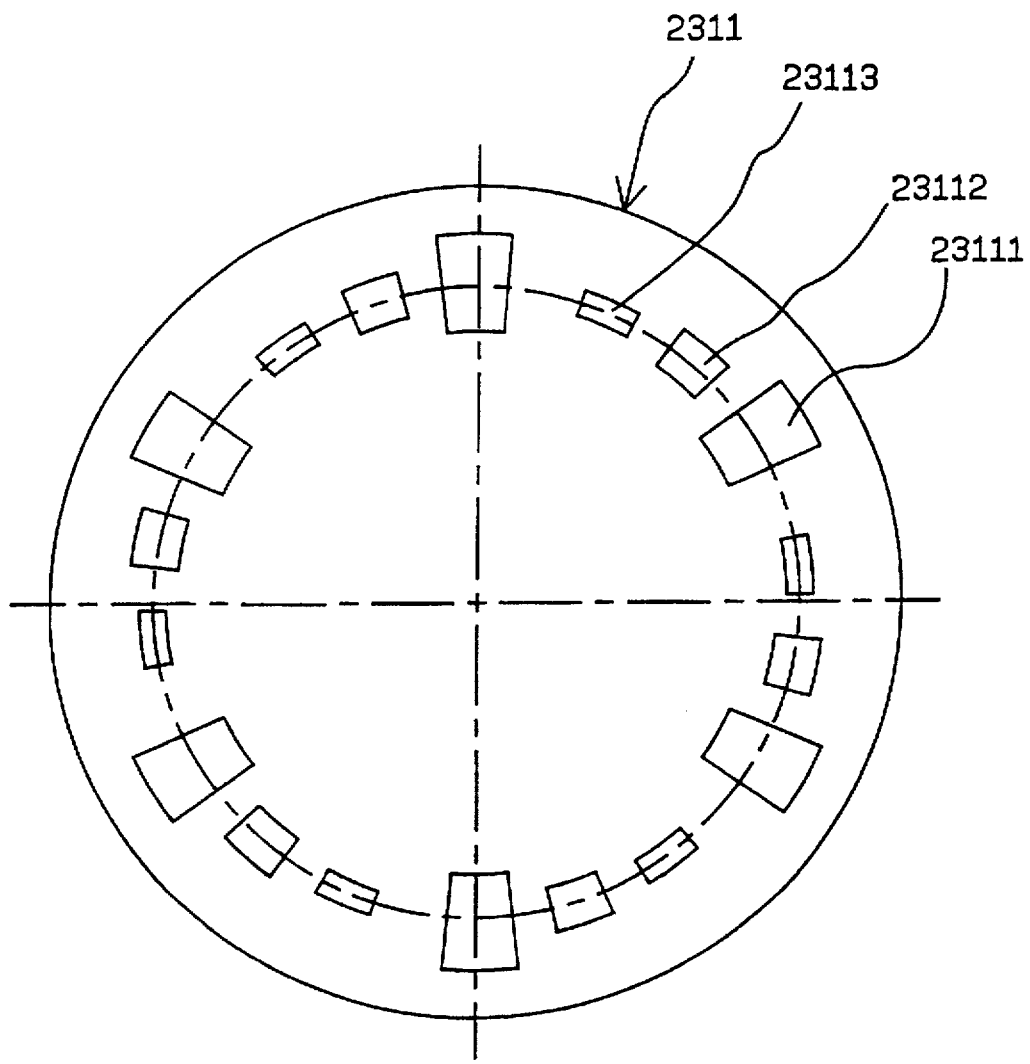
FIG. 5 is a schematic view showing a grid wheel with holes of different areas according to the present invention.

Referring now to FIG. 4, it is a perspective view showing a cursor controlling apparatus according to the present invention, which comprises a shell 20, and a rolling ball 21 mounted in and protruding from the shell 20. In each of X- and Y-directions inside the shell 20, there are a light source 22, a detection device 23 including a sensitizing device 231 which further comprises a grid wheel 2311 and a sensitizing element 2312 and a processing device 232 which may be an application specific integrated circuit or a microprocessor, and a mask 24 mounted on the surface of the grid wheel 2311 for light disperse prevention. The light source 22 and the sensitizing element 2312 are respectively a photo diode and a photo-transistor in the present embodiment. The grid wheel 2311 has plural holes 23111, 23112 and 23113 whose effective exposing areas are different from one another, as shown in FIG. 5. A method of a preferred embodiment according to the present invention for determining the direction a cursor should move on a monitor includes the steps of: emitting a light from the photo diode 22; through the photo transistor 2312 intermittently receiving the light through the different area holes 23111, 23112 and 23113 of the grid wheel 2311, and generating a series of voltage signals, e.g. A, B and C, according to the quantity of the received light in each hole; and by the processing device 232, e.g. an application specific integrated circuit, determining the direction that a cursor should move according to the sequence of the voltage signals, e.g. A→B→C→A→ . . .

Figure 6:
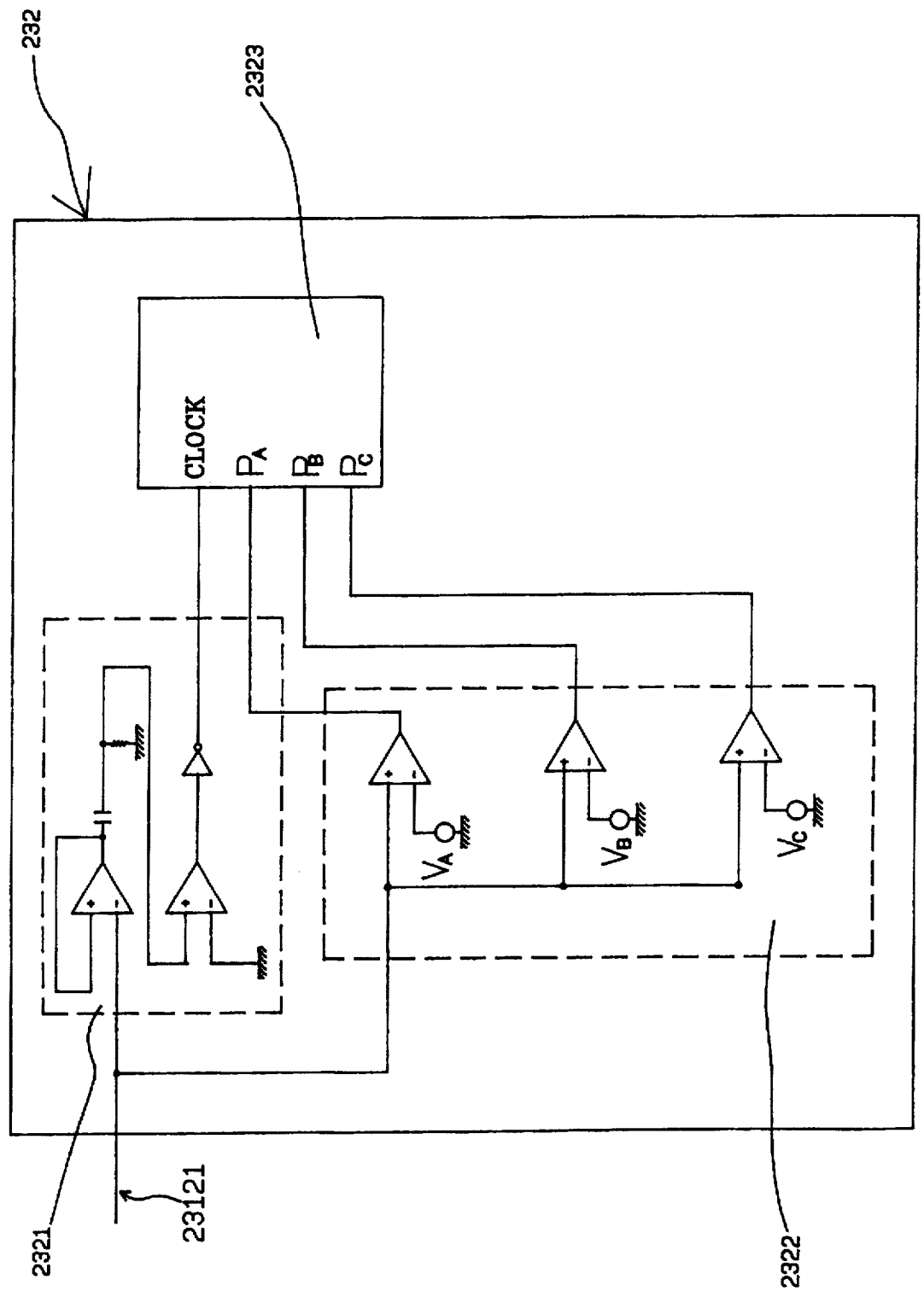
FIG. 6 is a circuit diagram showing a preferred embodiment of an application specific integrated circuit according to the present invention.
Figure 7:
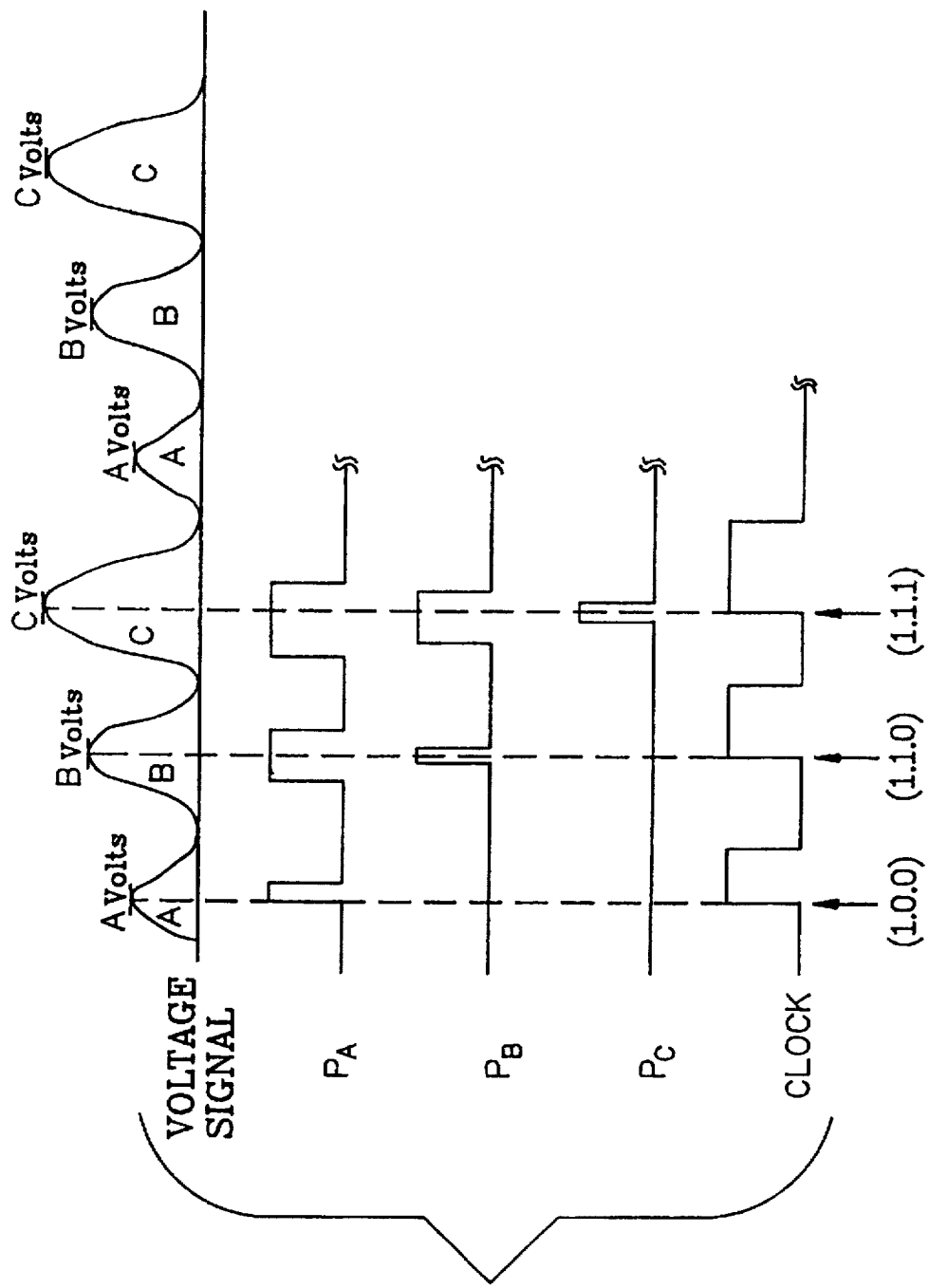
FIG. 7 is a schematic diagram showing the processing procedure of a series of voltage signals generated according to the present invention.

Please refer to FIGS. 6 and 7 which are respectively diagrams showing a preferred embodiment of an application specific integrated circuit according to the present invention and its processing procedure. An application specific integrated circuit 232 comprises a sampling circuit 2321, a comparing circuit 2322, a controller 2323, and three reference voltages Va, Vb and Vc, wherein Va<voltage of signal A, voltage of signal A<Vb<voltage of signal B, and voltage of signal B<Vc<voltage of signal C. On the moment that the comparing circuit 2322 receives a series of voltage signals 23121 generated by the photo transistor 2312, the sampling circuit 2321 also receives the series of voltage signals 23121 generated by the photo transistor 2312 and generates a clock which is triggered by and utilizes the peak of each voltage signal by a differentiating sampling method as a starting end of each cycle. By this way, the compared result will be more precise to determine an accurate moving direction since the controller 2323 can obtain the peak value of the voltage signal.

Figure 8:
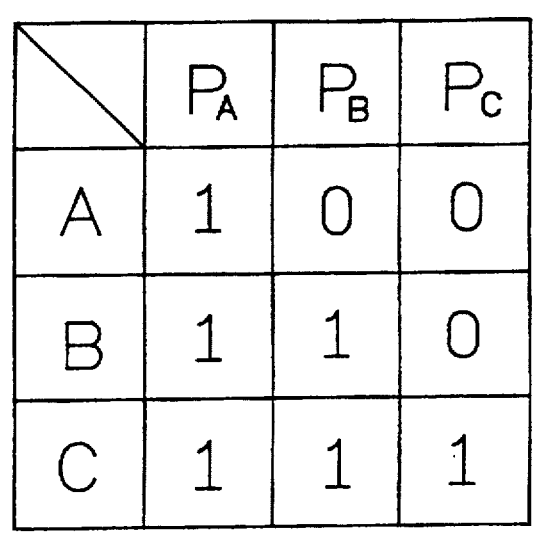

After the voltage values of signals A, B and C enter the comparing circuit 2322 and are compared by the comparing circuit 2322, the compared results are tabulated to obtain digital combination states, as shown in FIG. 8. Through the comparing circuit 2322, digital states (1,0,0), (1,1,0), (1,1,1), respectively corresponding to the voltage signal A, the voltage signal B and the voltage signal C are obtained. If the controller 2323 detects the digital state (1,0,0) is followed by the digital state (1,1,0), i.e. signal A is followed by signal B, it represents that the rolling ball moves rightwards or upwards. On the other hand, it represents that the rolling ball moves leftwards or downwards if the controller 2323 detects the digital state (1,0,0) is followed by the digital state (1,1,1), i.e. signal A is followed by signal C.

In practice, it may occur a situation that the user changes the direction of the rolling ball 21 before the light emitted by the photo diode 22 completely passes through the holes 23111, 23112 or 23113 of the grid wheel 3211. The photo transistor 2312 cannot properly receive the light to generate a correct series of voltage signals, and thus an undetermined bit will be caused and a jitter will be produced by the controller 2323. In order to prevent this mistake, the present controller 2323 gives up the first bit, e.g. by a software control manner, whenever the direction is changed. The principle of the present invention is to use one series of voltage signals to judge the direction that a cursor should move on a monitor. Therefore, of course, the modification in other parts may achieve the same purpose. For example, the shapes and sizes of holes 23111, 23112 and 23113 of the grid wheel 2311 may be changed to achieve the purpose of obtaining different areas therefore. As for the circuitry, it can be readily chosen or designed by those who are skilled in the art. For example, the processing device 232 may be an application specific integrated circuit, and may also be a microprocessor which uses a firmware thereof to execute the processing procedure. The circuit structure of the present invention is simpler and the responsive time is shorter than those of the prior one. Besides, the overall cost can be reduced, and the overflow situation can be avoided.

To sum up, the advantages of the present invention are described below:

1. Only a photo diode and a photo transistor in each of the X- and Y-directions are needed to generate the series of voltage signals for determining the moving direction, so the material cost and the assembling time are reduced;

2. The method of the present invention doesn't use the phase difference of two series of pulse-mode signals to detect the moving direction, so the defects caused by the insignificant phase difference, i.e. the aforementioned shortcomings 2 and 3 of the conventional apparatus, can be avoided.

3. The resolution of a cursor controlling apparatus depends on the number of holes of its grid wheel and the adjustment of the signal voltage is based on the areas instead of the widths of the holes of the grid wheel, so a reduced width for a certain area can be compensated by enlarging the length therefor to increase the number of the holes in the grid wheel, and therefore the resolution of the apparatus can be improved.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method used in a cursor controlling apparatus for detecting a direction that a cursor should move on a monitor, comprising steps of:

converting movement of the cursor controlling apparatus into rotational movement of a grid wheel in each of an X- and a Y-direction, wherein each grid wheel has at least three holes with three different sizes for transmitting light emitting from a respective light source to a respective photo detector;

intermittently receiving light passing through the grid wheels to obtain a single series of light with at least three different light intensity levels in each of the X- and the Y-direction;

generating a series of voltage signals having at least three different voltage waveforms respectively responsive to said series of light; and determining a cursor moving direction by comparing the different voltage waveforms.

2. A method according to claim 1, wherein said light is provided by a photo diode.

3. A cursor controlling apparatus for implementing said method according to claim 1, comprising:

a shell;

a driving device mounted in and protruding from said shell for moving said cursor on said monitor;

a single light source installed in said shell in each of said X- and Y-directions and emitting said light; and a single detection device installed in said shell in each of said X- and said Y-directions, engaging with said driving device, intermittently receiving said light to obtain said series of light with at least three different light intensity levels, converting said series of light into said series of different voltage waveforms, detecting said sequence of said voltage waveforms, and determining said direction said cursor should move on said monitor according to said sequence of said different voltage waveforms.

4. An apparatus according to claim 3, wherein said light source is a photo diode.

5. An apparatus according to claim 3, wherein said driving device is a rolling ball.

6. An apparatus according to claim 3, wherein said processing device is a microprocessor.

7. An apparatus according to claim 3, wherein said detection device includes:

a sensitizing device intermittently receiving said light to obtain said series of light with at least three different light intensity levels and converting said light into said series of different voltage waveforms; and a processing device detecting said sequence of said voltage waveforms, and determining said direction said cursor should move on said monitor according to said sequence of said voltage waveforms.

8. An apparatus according to claim 7, further comprising a mask installed on said grid wheel for light dispersion prevention.

9. An apparatus according to claim 7, wherein said sensitizing device is a photo transistor.

10. An apparatus according to claim 7, wherein said processing device is an application specific integrated circuit.

11. An apparatus according to claim 10, wherein said application specific integrated circuit includes:

a sampling circuit for generating a clock according to said series of voltage waveforms;

a comparing circuit for respectively comparing voltages of said voltage waveforms with a voltage reference whenever a cycle of said clock begins, and converting said voltage waveforms into digital signals according to compared results; and a controller triggered by said clock to obtain a digital combination state of said digital signals for determining said direction of said cursor according to said combination state.

12. An apparatus according to claim 11, wherein said voltage reference includes at least three different voltages.

* * * * *